United States Patent [19]

Neale, Jr.

[11] 4,258,321

[45] Mar. 24, 1981

[54] RADIO GEOPHYSICAL SURVEYING METHOD AND APPARATUS

[76] Inventor: Dory J. Neale, Jr., 4605 E. Kentucky, Denver, Colo. 80222

[21] Appl. No.: 922,104

[22] Filed: Jul. 5, 1978

Related U.S. Application Data

[63] Continuation-in-part of Ser. No. 884,825, Mar. 9, 1978, abandoned.

[51] Int. Cl.³ .............................................. G01V 3/17
[52] U.S. Cl. ................................................... 324/334
[58] Field of Search ........................... 324/4, 6, 334; 343/5 NA

[56] References Cited

U.S. PATENT DOCUMENTS

| | | | |
|---|---|---|---|
| 2,426,918 | 9/1947 | Barret | 324/6 |
| 2,573,682 | 11/1951 | Barret | 324/6 |
| 2,874,348 | 2/1959 | Brant et al. | 324/6 |
| 2,887,650 | 5/1959 | Ruddock et al. | 324/6 |
| 2,931,973 | 4/1960 | Puranen | 324/6 |
| 2,992,325 | 7/1961 | Lehan | 324/6 X |
| 2,994,031 | 7/1961 | Slattery | 324/6 |
| 3,168,694 | 2/1965 | Slattery | 324/6 |
| 3,594,633 | 7/1971 | Barringer | 324/6 |
| 3,609,522 | 9/1971 | Hutchins et al. | 324/6 |
| 3,617,866 | 11/1971 | Dowsett et al. | 324/6 X |
| 3,984,758 | 10/1976 | Millon | 324/6 |
| 4,010,413 | 3/1977 | Daniel | 324/6 |
| 4,100,482 | 7/1978 | Yamashita et al. | 324/6 |

FOREIGN PATENT DOCUMENTS

795919 10/1968 Canada .................................... 324/334

*Primary Examiner*—Gerard R. Strecker
*Attorney, Agent, or Firm*—Fishburn, Gold and Litman

[57] ABSTRACT

A method and apparatus for radio geophysical surveying includes measuring the relative magnitude and phase of radio frequency signal components reflected from subterranean formations. The apparatus comprises a transmitter selectively connected to a vertical antenna and a loop antenna, and a pair of receivers, one receiver being connected to a vertical antenna and the other connected to a loop antenna. A surface propagated calibration signal is transmitted and is received by each of the receivers. The outputs of the receivers are connected to the input of a difference amplifier, a difference signal is generated, and the magnitude and phase of the difference signal are measured and recorded. A survey signal, including surface propagated components and earth propagated components, is then transmitted. The survey signal is received, a difference signal is generated, and the magnitude and phase thereof are measured. For each position along the survey path, the calibration magnitude and phase are vectorially subtracted from the corresponding survey magnitude and phase, and the resultant magnitude and phase are plotted. At each position, the data is taken for an electric field vector alignment of the transmitter and receiver loop antennas, and for a magnetic field vector alignment thereof. The transmitter and receivers include means for precisely maintaining consistency throughout the survey.

19 Claims, 9 Drawing Figures

RADIO GEOPHYSICAL SURVEYING METHOD AND APPARATUS

This application is a continuation-in-part of my pending U.S. patent application Ser. No. 884,825, filed Mar. 9, 1978, now abandoned.

BACKGROUND OF THE INVENTION

The present invention relates to geophysical surveying and more particularly to improved methods and apparatus for radio geophysical surveying.

For many years geologists involved in geophysical surveying have relied exclusively upon data obtained by direct observation. Most of such information came from natural exposures, although some facts were revealed by artificial openings such as mines, tunnels, and railroad and highway cuts. In the last few decades, however, geophysical methods have become highly developed, chiefly under the impetus of the petroleum and mining industries. By the use of geophysical methods, especially when combined with existing geological information, it is possible to determine many of the physical properties of subsurface formations, even to depths as great as 10,000 feet and deeper.

Among the many geophysical methods are radio geophysical methods. Methods and apparatus for sending electromagnetic energy at radio frequencies into the earth and receiving reflections thereof with changes in intensity and/or phase noted are common in the prior art. The changes in the returned energy are indicative of the types of subterranean media through which the energy has travelled. Variations in the changes are indicative of different types of formations, faults, or mineral deposits.

It is generally recognized in radio geophysics that the incident radio waves are changed due to the electrical properties of intervening media. These properties include principally the conductivities, the magnetic permeabilities, and the dielectric constants of the various strata and deposits therein. Further, the radio waves are affected by the size of a deposit, its depth below the surface, and its orientation.

In order to practice a radio geophysical method, it is necessary to generate radio waves, propagate them into the earth, receive waves reflected from the formations within the earth, and measure certain parameters of the reflected waves. The most common parameters of interest are the magnitude and the phase of the reflected waves. A common manner of measuring these parameters is to transmit a reference wave or signal that is surface propagated and, in the receiver, to separate the effects of the reflected wave from the effects of the surface wave. A widely used technique for separating the surface and earth propagated waves and the effect thereof is known as polarization diversity, wherein the surface waves and the earth waves are given different polarizations. The waves may be received on antennas connected to separate receivers, each antenna having a different response polarization, and the parameters of the reflected waves may be measured with respect to the surface waves.

The polarization direction of an electromagnetic wave is the direction of the electric field vector thereof. It has been found that a wave must be horizontally polarized, that is the electric field vector must be horizontal for the wave to be propagated into the ground. One reason for this is that a horizontally polarized wave may have magnetic field intensity vector components in all directions perpendicular to the electric field vector. The propagation direction of an electromagnetic wave is in a direction perpendicular to the mutually perpendicularly electric and magnetic field vectors. For the horizontal electric field vector with a horizontal magnetic field vector, the direction of propagation is vertical. In contrast, a vertically polarized wave with a vertical electric field vector could only have a horizontal magnetic field vector. The direction of propagation would, consequently, be horizontal; therefore, the vertically polarized wave would not be propagated into the earth.

Since a vertically polarized signal is propagated principally in a horizontal direction and not into the ground where changes in its magnitude and phase might occur, a vertically polarized wave is generally employed as a reference signal. Since a horizontally polarized signal can be propagated into the ground, such a polarized signal is employed for determining characteristics of subterranean formations.

In most radio geophysical methods, relative magnitude and phase of reflected waves are measured at each of a plurality of locations along a survey path. Data points are then plotted as a function of position and connected by a continuous curve. The variations of the curves in relation to position are then indicative of the electrical nature of the earth at each position.

One radio geophysical apparatus, as disclosed in U.S. Pat. No. 2,994,031, issued to Slattery, comprises a transmitter connectible to either a vertical antenna or a loop antenna and a pair of receivers, one connected to a vertical antenna and the other connected to a loop antenna, a phase shifter, and phase and volt meters. During transmission on the vertical antenna, the receivers each receive a signal. The signal received by the vertical receiver is adjusted in magnitude and phase and added to the signal received by the loop receiver whereby cancellation or nulling occurs. Then the loop is connected to the transmitter, and a signal is transmitted. The part of the transmitted signal originating from the horizontal arms of the loop antenna is horizontally polarized and is propagated into the ground, reflected back, and received by the loop receiver. The vertically polarized component, from the vertical arms of the loop antenna, is surfaced propagated and is received by the vertical receiver and by the loop receiver. The receivers are adjusted in an attempt to null the vertically polarized signal components, such that the remaining signal in the receivers is, for the most part, due to the reflected signal components.

A very important requirement in a radio geophysical surveying method is consistency throughout the survey, and from survey to survey. Otherwise, useful comparison of plots derived from various surveys is impossible. Not only should the transmission power level and frequency be consistent, but also the receiver stage gains, spacing between the transmitting and receiving antennas, and the orientation of the antennas. A further aid to consistency is automation of the survey routine to the extent possible in order to diminish human error.

Some of the prior art radio geophysical survey methods and devices apparatus, including that of U.S. Pat. No. 2,994,031 mentioned above, require the operator to make manual adjustments for nulling the effect of the reference signal in the receivers. Others require the visual reading of meters for data taking. Such actions inherently involved inaccuracies, and during a survey wherein a great many adjustments and readings must be made, operator fatigue seriously affects the accuracy of the survey.

The methods and apparatus of the present invention have application in surveying for geologic faults, hydrocarbon deposits, and other mineral deposits. Petroleum deposits are generally accompanied by a gas cap or "halo" comprising mixtures of methane, ethane, and propane in porous strata surrounding the strata containing petroleum. These gases are known to be paramagnetic; that is, they have a relative permeability greater than that of a vacuum, which is unity. Petroleum itself is dielectric. Therefore, an electromagnetic wave incident upon a petroleum deposit is changed because of the difference in electrical properties of the petroleum and gas from the surrounding media. One of the changes which occurs in an apparent amplification of the transmitted waves which occurs with the transmitting and receiving antennas in certain mutual orientations. One theory is that the amplification is caused by a combination of effects of the magnetic field components of the transmitted waves and the earth's magnetic field on the paramagnetic gases.

By way of explanation, in a paramagnetic substance the atoms form small dipole type molecules. The molecules are normally randomly oriented with respect to each other. If a finite magnetic field is applied, the dipoles become aligned in the direction of the magnetic field. Thus, energy from the earth's magnetic field is stored in the dipoles. When these paramagnetic materials are subjected to an RF wave of proper frequency, in the presence of a finite magnetic field, the dipoles tend to self-oscillate in a resonance mode, thus imparting energy into the reflected wave and acting like an amplifier. The energy is imparted to the wave by way of the magnetic field vector thereof. It is known that current may be induced in a conductor, such as en element of an antenna, by either the electric field vector of a wave or by the magnetic field vector or by a combination of the two according to the orientation of the conductor. Therefore, by placing a transmitting antenna and a receiving antenna in an orientation such that the current in the receiving antenna is derived from the magnetic field vector, changes in a wave caused by paramagnetic substances can be detected.

In a similar manner, the electric field vector of a wave is affected by the dielectric nature of a substance such as petroleum. Therefore, a mutual transmitting and receiving antenna orientation, wherein the current in the receiving antenna is derived from the electric field vector, may be employed for detecting changes in a wave caused by dielectric substances.

Heretofore, the detection of effects on the electric and magnetic field vectors was generally accomplished by resolving a received signal into resistive, inductive, and capacitive components or, in other terms, in-phase and quadrature leading or lagging components. In most such systems, only the resistive or in-phase components are of interest because the systems are directed to prospecting for conductive ores, and the non-resistive information is discarded as being of no use. The method of the present invention includes the taking of data with the transmitting and receiving antennas in both an "electric" orientation and a "magnetic" orientation, whereby no resolution of resistive, inductive, and capacitive components is required. The method of the present invention, therefore, has application, without modification, in surveying for many types of subterranean formations.

SUMMARY OF THE INVENTION

The principal objects of the present invention are: to provide a reliable and accurate method of radio geophysical surveying; to provide such a method wherein the relative magnitude and phase of signal components reflected from subterranean formations are measured and plotted to ascertain the nature of said formations; to provide such a method wherein the magnitude and phase of the reflected signal components are measured with transmitting and receiving antennas in both electric and magnetic field vector alignments; to provide such a method including a step for measuring the depth of the subterranean formations; to provide such a method wherein the apparatus for practicing said method is carefully monitored and maintained in consistent adjustment, whereby data from one survey is comparable with data obtained from other such surveys; to provide such a method wherein actual data measurements are taken automatically for increased accuracy; to provide such a method and apparatus having a computer for storing, manipulating, and controlling the plotting of the data; to provide such an apparatus which is accurate, consistent, and efficient in use, capable of a long operating life, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but as a basis for the claims and as a representative basis for teaching one skilled in the art to variously employ the present invention in virtually any appropriately detailed structure.

Figure 1:
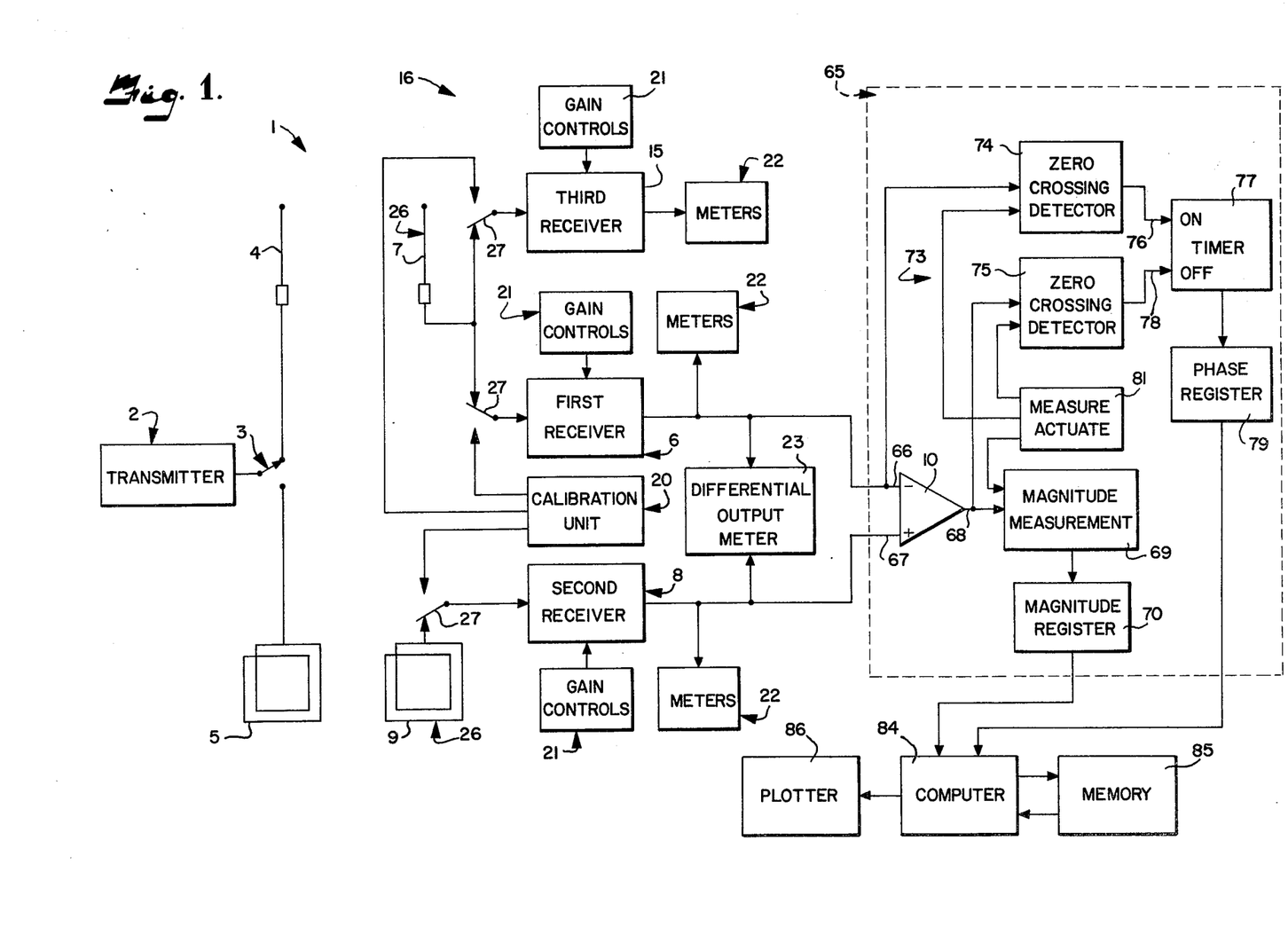
FIG. 1 is a simplified, schematic, block diagram of a radio geophysical surveying apparatus embodying the present invention.

Referring to the drawings in more detail:

The reference numeral 1 generally designates an apparatus for radio geophysical surveying embodying the present invention which includes a transmitter 2 having a switch 3 for selective connection of a vertical antenna 4 or a loop antenna 5 thereto. A first receiver 6 is connected to a receiver vertical antenna 7, and a second receiver 8 is connected to a loop antenna 9. The receiving antennas 7 and 9 have response patterns respectively similar to the radiation patterns of the transmitting antennas 4 and 5. The transmitter 2 and the receivers 6 and 8 are all tuned to a common, predetermined frequency. A surface propagated calibration signal is transmitted from the transmitter 2 through vertical antenna 4 and is received by receivers 6 and 8 through their associated antennas 7 and 9. The output of each of the receivers 6 and 8 is connected to the input of a differential comparing means or difference amplifier 10, wherein a difference signal proportional to the difference of the output signals of receivers 6 and 8 is generated, and the magnitude and phase of the same are measured and recorded. A survey signal, including surface propagated components and earth propagated components, is then transmitted by the transmitter 2 through the loop antenna 5, the earth propagated components being reflected to the surface by subterranean formation. The survey signal is received by receivers 6 and 8 through their associated antennas 7 and 9, and a second difference signal is generated. The magnitude and phase of the survey difference signal are measured and recorded. For each position along the survey path, the calibration magnitude and phase are vectorially subtracted from the corresponding survey signal magnitude and phase, and the resultant magnitude and phase are plotted. At each position along the survey path, a survey reading is taken for an electric field vector orientation of the transmitter and receiver loops 5 and 9, and for a magnetic field vector orientation thereof.

In addition to the receivers 6 and 8, the apparatus 1 preferably includes a third receiver 15 which is connected to the vertical antenna 7. The third receiver 15 is a control receiver and is employed for monitoring the power output of the transmitter 2 and for establishing common gain characteristics among the receivers in order to achieve consistency in surveying. The third receiver 15 is not employed for actual data taking.

Figures 6, 7, 8:
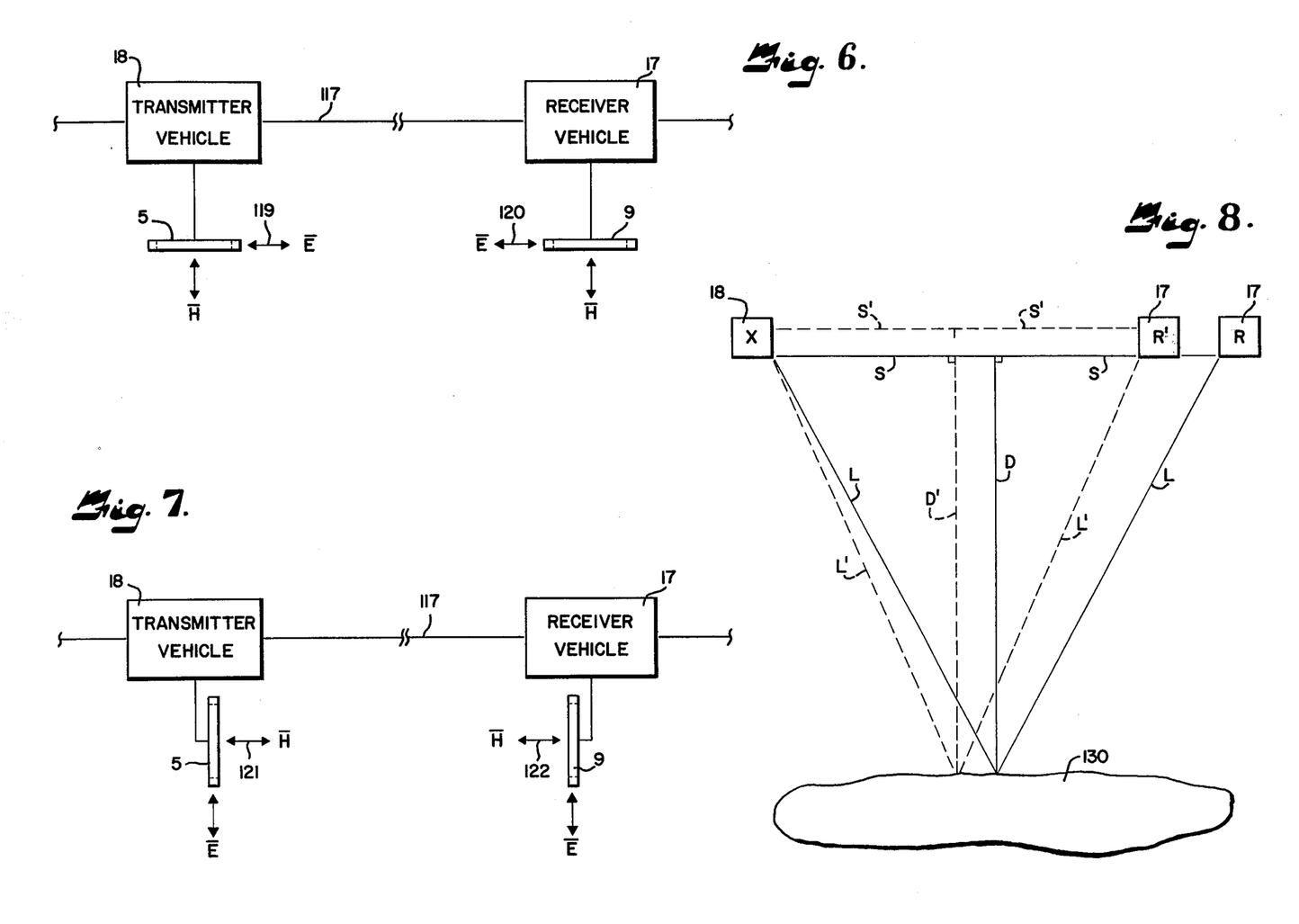
FIG. 6 is a diagramatic plan view of loop antennas for the transmitter and receiver, being shown in an electric field vector alignment.
FIG. 7 is a view similar to FIG. 6, and shows the transmitter and receiver loop antennas in a magnetic field vector alignment.
FIG. 8 is a diagrammatic illustration of a method for determing the depth of a subterranean formation using said apparatus.

The three receivers 6, 8 and 15 along with their antennas 7 and 9, and associated measuring and monitoring circuits, comprise a composite receiver 16 which is preferably mounted in and operated from a receiver vehicle 17 (FIGS. 6 and 7). Similarly, the transmitter 2 and its antennas 4 and 5 and associated monitoring circuits are mounted in and operated from a transmitter vehicle 18.

The composite receiver 16 includes a calibration unit 20 which is selectively connectible to each of the first, second and third receivers. The calibration unit 20 is operative to generate a signal of known frequency and signal level which may be injected into each of the receivers 6, 8 and 15 so that the gains of the respective receivers may be adjusted to a common output signal strength for the known strength of the signal input thereinto. Each of the receivers 6, 8, and 15 includes gain controls, generally designated in FIG. 1 by the reference numeral 21, for adjusting the gains of the respective receivers. Further, each receiver includes meters, generally designated at 22 in FIG. 1, for indicating the output signal strengths of the respective receivers.

While it is not a necessity, it is preferred that the outputs of the first and second receivers 6 and 8 be equal in strength for greater accuracy. In order to assist the operator in adjusting the outputs of the first and second receivers to equality, or balancing the receivers, a differential output meter 23 is connected between the outputs of the first and second receivers 6 and 8 respectively. The differential output meter 23 has a reading of zero when the outputs of the receivers 6 and 8 are equal and a reading above or below zero when the outputs are not equal. The differential output meter 23 is a magnitude measuring instrument and does not take into account phase differences between the output signals of the first and second receivers.

Figure 2:
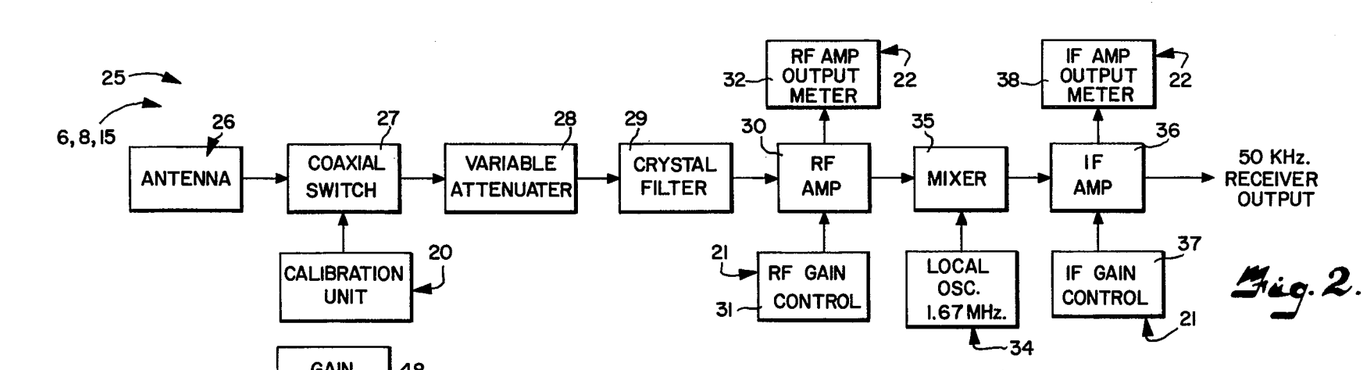
FIG. 2 is block diagram of an arrangement used for each of several receiver portions of the apparatus.

The illustrated receivers 6, 8, and 15 are substantially similar in construction. FIG. 2 illustrates a receiver arrangement 25 which is common to each of the illustrated receivers 6, 8, and 15. The receiver arrangement 25 includes an antenna 26 which may be either the vertical antenna 7 or the loop antenna 9. The antenna 26 includes impedance matching networks (not shown) for matching the impedance of the particular antenna and transmission line to the receiver. The antenna 26 is connected to a coaxial switch 27 which is selectively operable to connect either the antenna 26 or the calibration unit 20 to the receiver arrangement 25. The coaxial switch 27 is connected through a variable attenuator 28 and a crystal filter 29 to an RF amplifier 30 of the receiver arrangement 25. The attenuator 28 may be adjusted to provide from one to 69 decibels of attenuation to the received signal in order to compensate for the high signal level resulting from the short separation distance between the transmitter 2 and the composite receiver 16 during surveying. The crystal filter 29 is a very narrow bandpass filter which makes the receiver arrangement 25 extremely selective, having a 25 hertz pass band, whereby the receiver arrangement 25 is not subject to interference from off-frequency signals. The preferred operating frequency of the surveying apparatus 1 is 1.62 megahertz which is just slightly above the AM broadcast band. Therefore, the receiver arrangement 25, which might otherwise be subject to interference from strong local broadcast stations, is able to reject all but a very narrow band of frequencies.

The RF amplifier 30 provides gain to the received signal and increases the signal-to-noise ratio thereof. The RF amplifier 30 includes an RF gain control 31 for adjusting the gain thereof. To assist in adjusting the gain of the amplifier 30, an RF amplifier output meter 32 is connected to the RF amplifier 30. Preferably, the receiver arrangement 25 is a superheterodyne receiver. Therefore, the receiver arrangement 25 includes a local oscillator 34, a mixer 35, and an IF amplifier 36. In the illustrated embodiment, the local oscillator 34 operates at a frequency of 1.67 megahertz whereby the output signal from the IF amplifier 36 has a frequency of 50 kilohertz. The frequency of the received signal is converted to the intermediate frequency in the receiver arrangement 25 for reasons that are well known in communications arts, namely that greater gain may be achieved in the receiver without risk of instability, feedback, or the like. The IF amplifier 36 includes an IF gain control 37 and an IF output meter 38.

Figure 3:
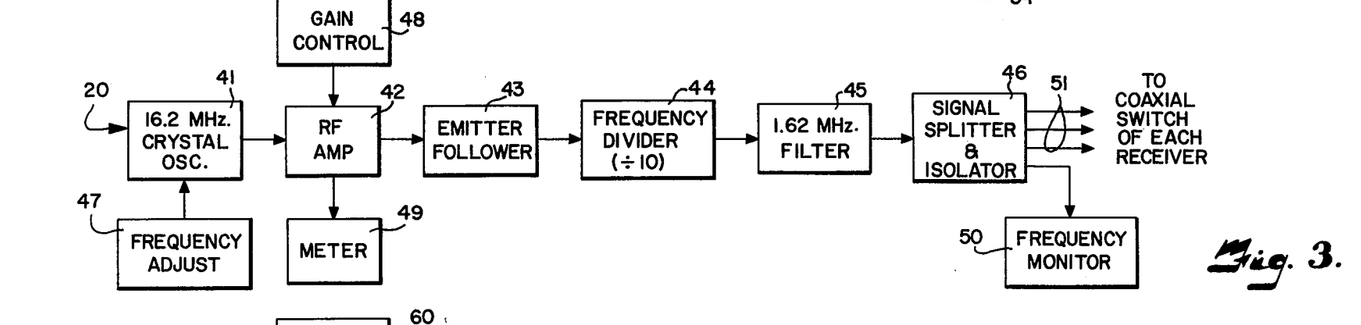
FIG. 3 is a block diagram of a calibration unit used in conjunction with the receivers.

Referring to FIG. 3, the calibration unit 20 includes a 16.2 megahertz crystal oscillator 41, an RF amplifier 42, an emitter follower 43, a frequency divider 44, a 1.62 megahertz filter 45, and a signal splitter and isolater 46. The calibration unit 20 employs a frequency control method wherein a signal is generated at a high order multiple of the desired frequency, the frequency of said signal being controlled at the high order multiple; and the signal is frequency divided to obtain the desired frequency. Frequency standard crystals are generally able to establish the frequency of an oscillator within a given number of cycles of the nominal frequency thereof whether the frequency is low or high, within reasonable limits. By generating a high order multiple of the frequency desired, and frequency dividing to obtain the desired frequency, the frequency error is also divided by the same factor. For example, in the calibration unit 20 a 1.62 megahertz signal is desired. However, a 1.62 megahertz crystal is likely to have the same frequency tolerance as a 16.2 megahertz crystal. Therefore, by using the 16.2 megahertz crystal and frequency dividing by 10, the frequency error of the 16.2 megahertz crystal is thereby diminished by a factor of 10. In the illustrated calibration unit 20, the frequency tolerance is on the order of plus or minus 2 hertz. The oscillator 41 includes a frequency adjustment control 47 for making fine adjustments in the frequency of the oscillator 41.

The RF amplifier 42 provides gain for the output of the oscillator 41. The RF amplifier 42 includes a gain control 48 which is operable in cooperation with an output meter 49 to control the output signal strength of the calibration unit 20. The emitter follower 43 isolates the amplifier 42 from the later stages of the calibration unit 20. The frequency divider 44 is a type of counter which emits a single pulse for every 10 cycles of the signal input thereinto. The output of the frequency divider is a square wave pulse train which is converted to a sinusoidal signal by the filter 45 which is sharply tuned to the frequency of 1.62 megahertz. The signal splitter and isolater 46 has four identical outputs which are isolated from each other. One of the outputs of the signal splitter 46 is connected to a frequency monitor 50. The remaining three outputs 51 of the signal splitter 46 are connected to the respective coaxial switches 27 of the receivers 6, 8, and 15.

Figure 4:
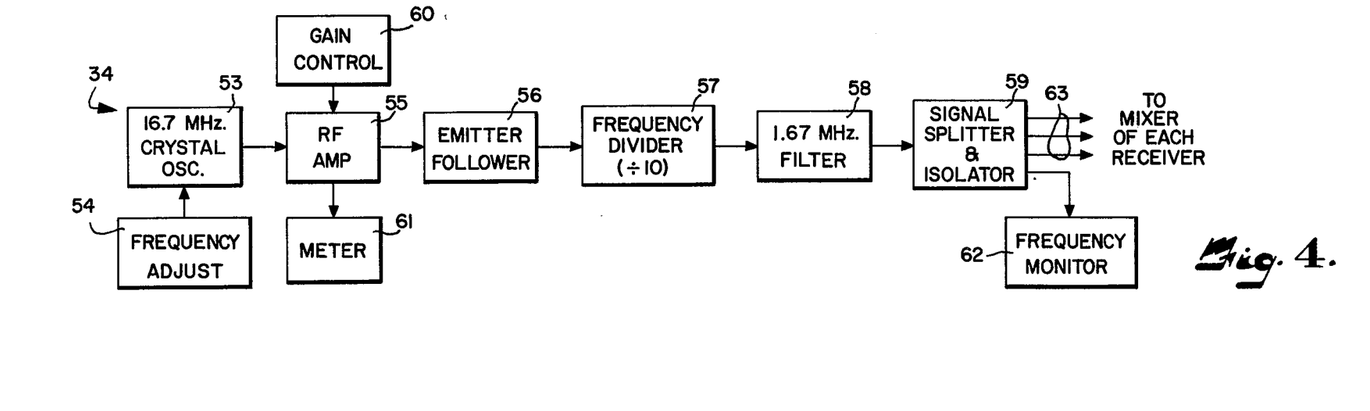
FIG. 4 is a block diagram of a local oscillator for use in conjunction with the receivers.

FIG. 4 illustrates a local oscillater for use with the receivers 6, 8, and 15. The local oscillator 44 is substantially similar to the arrangement used for the calibration unit 20. The local oscillator 34 includes a 16.7 megahertz crystal oscillator 43 with a frequency adjustment control 54 connected thereto, an RF amplifier 55, an emitter follower 56, a frequency divider 57, a 1.67 megahertz filter 58, and a signal splitter and isolater 59. The local oscillator 34 includes a gain control 60 and an output meter 61, illustrated as being connected to the RF amplifier 55, for adjusting the output signal strength of the local oscillator 34. The signal splitter and isolater 59 has four identical outputs which are isolated from each other. One of the outputs of the signal splitter 59 is connected to a frequency monitor 62, while the remaining three outputs 63 are connected to the respective mixers 35 of each of the receivers 6, 8, and 15. The operation of the various parts of the local oscillator 34 is similar to the operation of the corresponding parts in the calibration unit 20, the principal difference being the frequency of operation of the local oscillator 34.

It is important that the outputs 51 of the calibration unit 20 be mutually identical and that similarly, the outputs 63 of the local oscillator 34 be mutually identical for the reasons of consistency and repeatability in surveying. In addition, it is necessary that the output signals of the local oscillator 34 be in phase so that the phase relationship of the received signals is not altered.

Referring again to FIG. 1, the outputs of the first receiver 6 and the second receiver 8 are connected to means, generally designated at 65, for measuring the magnitude and phase of the difference of the signals output therefrom. The magnitude and phase measuring means 65 includes the difference amplifier 10 having the output of the first receiver 6 connected to the inverting input 66 and the output of the second receiver 8 connected to the non-inverting input 67 of the difference amplifier 10. Therefore, a signal at the output 68 of the difference amplifier 10 is proportional to the complex or vector difference of the output signal of the first receiver 6 and the output signal of the second receiver 8. The magnitude of the difference signal at the output 68 is measured by a magnitude measuring means 69, and the measured magnitude is stored in a magnitude register 70. The magnitude measuring means 69 may be a peak detector or the like (not shown) having the components thereof dimensioned to express the magnitude of the difference signal in convenient units. Preferably the magnitude register 70 is a digital register; therefore, the magnitude measuring means 69 may include an analog to digital converter (not shown).

The magnitude and phase measuring means 65 includes means 73 for measuring the phase of the difference signal at the output 68 with respect to or in reference to the output signal of the first receiver 6 at the inverting input 66. The phase measuring means 73 includes a first zero crossing detector 74 connected to the output of the first receiver 6 and a second zero crossing detector 75 connected to the output 68 of the difference amplifier 10. The first zero crossing detector 74 is connected to the ON input 76 of a timer 77, while the second zero crossing detector 75 is connected to an OFF input 78 of the timer. The timer 77 may be a pulse oscillator which generates a pulse train during the interval between the turning on of the timer and the turning off thereof. The frequency of the pulse train of the timer 77 is chosen in relation to the IF frequency of the first and second receivers 6 and 8 (50 kilohertz) such that the phase of the difference signal from the difference amplifier 10 may be expressed in convenient time or angular units. The zero crossing detectors 74 and 75 are operative to have a certain output whenever their respective inputs are at zero volts. The outputs of the zero crossing detectors are operative to either turn on or turn off the timer. The timer 77 is connected to a phase register 79 which is operative to digitally accumulate and store the pulse train from the timer 77. The magnitude and phase measuring means 65 includes a measure actuate switch 81 which is operable to initiate measurement of the magnitude and phase of the difference signal from the difference amplifier 10. The measure actuate switch 81, when operated, effects activation of the zero crossing detectors 74 and 75 for a time interval equal to the period of one cycle at the frequency of 50 kilohertz for measuring the phase difference of the signals at the inverting input 66 and the output 68 of the difference amplifier 10 and, further, causes the magnitude of the difference signal to be stored in the magnitude register 70.

The surveying apparatus 1 preferably includes a digital computer 84 for controlling the storage, manipulation, and plotting of data. The computer 84 includes a memory 85 for storing the data generated during the survey and for storing the results of manipulation of the data. The computer 84 further includes a plotter 86 for graphing the results of manipulation of data from surveying. The computer 84 is operative to receive the magnitude and phase respectively from the magnitude and phase registers 70 and 79. During transmission of the survey signal for the same position on the survey path, the magnitude and phase of the survey difference signal are stored in the memory 85. The computer 84 includes complex arithmetic means or may be programmed to perform complex arithmetic whereby the calibration magnitude and phase are substracted vectorially, or in complex arithmetic, from the survey magnitude and phase, and the resultant magnitude and phase are stored in the memory 85. When the survey has been completed, the computer 84 may be instructed to recall the magnitude for each position from the memory 85 and to cause the plotter 86 to plot the magnitudes versus position. In a like manner the phases for each position may be caused to be plotted.

Figure 5:
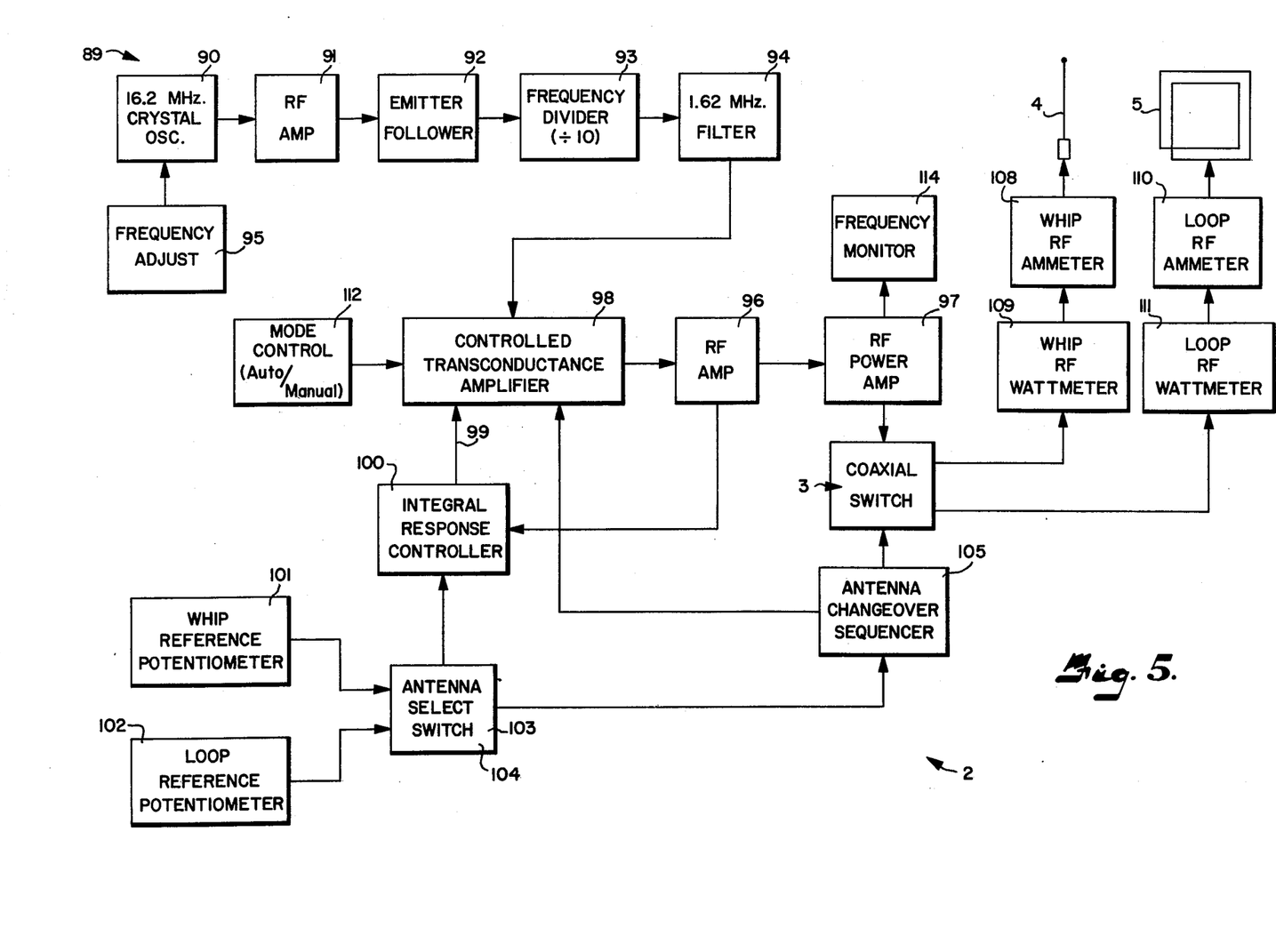
FIG. 5 is block diagram of a transmitter portion of the radio geophysical surveying apparatus.

The transmitter 2 of the surveying apparatus 1 may take any suitable form, and a preferred arrangement for the transmitter 2 is illustrated in FIG. 5. The transmitter 2 includes an oscillator section 89, comprising a 16.2 megahertz crystal oscillator 90, an RF amplifier 91, an emitter follower 92, a frequency divider 93, and a 1.62 megahertz filter 94 arranged to provide an excitation signal for the transmitter 2. The oscillator section 89 is constructed similar to the calibration unit 20 and the local oscillator 34 of the composite receiver 16 and operates in a similar manner. The oscillator 90 includes a frequency adjustment 95. The output signal from the filter 94 may be further amplified, such as by an RF amplifier 96, and then applied to an RF power amplifier 97 for radiation from one of the transmitter antennas 4 or 5 connected to the power amplifier 97 by the antenna switch 3.

In the transmitter 2 of the present invention, it is desirable to maintain precise control over the power output of the transmitter 2. Therefore, the transmitter 2 includes automatic means for maintaining a preset power output level comprising a voltage controlled amplifier or a controlled transconductance amplifier 98 connected between the filter 94 and the RF amplifier 96. The gain of the amplifier 98 may be controlled by a voltage connected to a control input 99 thereof. The voltage at the input 99 is developed by a level sensing means or integral response controller 100 which is connected to the RF amplifier 96. The integral response controller 100 senses the output level of the RF amplifier 96 and develops a voltage at the input 99 which is proportional to the difference between the power level of the amplifier 96 and a preset level. The voltage developed is operative to change the gain of the controlled transconductance amplifier 98 such that deviation from the preset level is nullified. The power level which the integral response controller 100 maintains may be preset by means of a potentiometer connected thereto. In the transmitter 2 it is desirable to transmit at different power levels on the whip and loop antennas 4 and 5 respectively. Therefore, the power level is preset for the whip antenna 4 by means of a whip reference potentiometer 101 and for the loop antenna 5 by a loop reference potentiometer 102. The transmitter 2 includes switch means 103 for selecting one of the reference potentiometer. In the illustrated transmitter 2 the switch means 103 is combined with an antenna select switch 104 which is operable to effect connection of either the whip antenna 4 or the loop antenna 5 to the power amplifier 97 through the antenna switch 3. Operation of the antenna select switch 104 selects one of the reference potentiometers 101 or 102 and simultaneously effects connection of the corresponding antenna, 4 or 5, to the power amplifier 97. The antenna switch, or coaxial switch, 3 preferably includes relays therein (not shown) which are connected to the antenna select switch 104 and controlled thereby.

It is desirable to reduce the power output level of the power amplifier 97 during switching of the antennas in order to prevent possible damage to the elements of the power amplifier 97 and also to the switching contacts of the antenna switch 3. Therefore the transmitter 2 includes an antenna changeover sequencer 105 connected between the antenna select switch 104 and the coaxial switch 3 and having an output connected to the voltage controlled amplifier 98. The antenna changeover sequencer 105 is operative to cause the gain of the amplifier 98 to be reduced whereby the power output level of the power amplifier 97 is reduced to a low level during the actual switching between the antennas 4 and 5.

The whip antenna 4 includes a RF ammeter 108 and an RF watt meter 109 connected thereto for monitoring the power output level thereon. Similarly, the loop antenna 5 includes an RF ammeter 110 and an RF watt meter 111. When it is desired to set the power output level of the whip antenna 4, the antenna select switch is thrown to the "whip" position which selects the whip reference potentiometer 101 and effects connection of the RF power amplifier 97 to the whip antenna 4. During setting of power level, it is necessary to defeat the automatic control mechanism of the voltage controlled amplifier 98, otherwise the amplifier 98 would attempt to maintain the previously set power level. Therefore, the amplifier 98 includes a mode control switch 112 having an automatic setting and a manual setting, the manual setting being selected during the setting of the power levels. The whip reference potentiometer 101 is then adjusted manually while monitoring the whip ammeter 108 and watt meter 109 until the desired power level has been reached. In a similar manner, the power level for the loop antenna 5 may be set by means of the loop reference potentiometer 102 in conjunction with the loop ammeter 110 and watt meter 111. The transmitter 2 may include a frequency monitor 114 connected to the power amplifier 97, for example, for use in conjunction with the frequency adjustment 95 in finely adjusting the frequency of the oscillator 90.

In using the surveying apparatus 1, the area to be surveyed is mapped and divided along a plurality of parallel, adjacently disposed survey lines, along each of which the transmitter and receiver units will traverse and take readings. A beginning or reference point, having known coordinates and lying along one of the survey paths 117, is selected to initiate the survey. Either the transmitter or receiver vehicle is positioned at the reference point, and the other vehicle is positioned a predetermined distance along the survey path from the first vehicle. In the example illustrated in FIGS. 6 and 7, the transmitter vehicle 18 is positioned at the reference point, and the receiver vehicle 17 is positioned a distance in the nature of 0.4 to 0.7 miles therefrom. This separation distance between the two vehicles is generally fixed for a given survey, but may be varied from survey to survey depending upon the type of soil and depth and the type of deposits. The vehicles are provided with means, such as precision odometers, to facilitate accurately positioning the vehicles the preselected distance apart. The vehicles are then similarly oriented, as illustrated in FIGS. 6 and 7, to facilitate the taking of data readings. Each of the vehicles is provided with means, such as a precision compass, to accurately orient the vehicles into a position wherein the respective loop antennas 5 and 9 may be sequentially disposed in a mutually aligned, electric, orientation (FIG. 6) and a mutually parallel, magnetic, orientaion (FIG. 7).

After the vehicles have been spaced apart and oriented along the survey path 117, the loop antennas 5 and 9, which are preferably stowed in the respective vehicles 17 and 18 during transport, are deployed and assume an initial, in-line orientation, as illustrated in FIG. 6. The transmitter 2, receivers 6, 8, and 15, and the calibration unit 20 are then activated and allowed to warm up to a stable condition. The transmitter 2 is capable of transmitting a signal at 1.62 megahertz, plus or minus 2 hertz, at a power range in the nature of 0 to 160 watts. The power level of the transmitted signal from the vertical and loop antennas, 4 and 5, is adjusted on the potentiometers 101 and 102 such that the field strength at the receiver vehicle 17 is substantially the same for both antennas. It has been found that a power level of 2 to 5 watts for the vertical antenna 4 and 70 to 100 watts for the loop antenna 5 is satisfactory for typical applications.

The coaxial switches 27 are operated to connect the calibration unit 20 to each of the first, second, and third receivers. The calibration unit 20 is actuated to inject an identical signal into each of the receivers for the purpose of establishing common gain characteristics thereamong. It is desirable to establish said common gain characteristics so that the receivers will be working in similar regions of the operating ranges thereof. By this means, uniform receiver response is assured. Further, surveys are repeatable, and surveys made at different times and places can be realistically compared. The output signal strength of the calibration unit 20 at the coaxial switch 27 is equal to the signal strength that would be developed at the coaxial switch 27 by an antenna 26 during reception of a signal from the transmitter 2 operating at the transmitter output power level mentioned above, the signal strength of the calibration unit 20 having been determined empirically. During operation of the calibration unit 20, the RF amplifiers 30 of each of the receivers 6, 8, and 15 are adjusted for a predetermined reading on the respective RF output meters 32, preferably a mid-scale reading in the case of analog type meters. Subsequently, the IF amplifiers 36 of the receivers 6, 8, and 15 are adjusted for similar identical mid-scale readings on the respective IF output meters 38, The respective coaxial switches 27 are then operated to connect the first and third receivers 6 and 15 to the whip antenna 7 and the second receiver 8 to the loop antenna 9.

The transmitter 2 is connected to the vertical transmitting antenna 4, and a calibration signal containing vertically polarized signal components only is transmitted. During reception of the calibration signal by the third receiver, the meters 22 thereof are read. If the readings of the third receiver meters 22 differ substantially from the readings obtained during operation of the calibration unit, the power level of the transmitter is adjusted until the readings are the same. During reception of the calibration signal by the first and second receivers 6 and 8, the outputs from the IF amplifiers 36 thereof are adjusted until the differential output meter 23 reads zero. The measure actuate switch 81 is then operated, whereby the magnitude of the calibration difference signal at the output 68 of the difference amplifier 10 and the phase thereof are measured and stored respectively in the magnitude register 70 and the phase register 79. The computer 84 is then activated whereby the magnitude and phase values in the registers 70 and 79 are transferred into the memory 85 of the computer. It should be noted that the output signal from the first and second receivers 6 and 8, even though balanced will have a phase difference because of the difference in components required to match the whip antenna 7 and the loop antenna 9 respectively to the first receiver 6 and the second receiver 8. The transmitter 2 is then switched to the transmitting loop 5, and a survey signal containing both vertically and horizontally polarized signal components is transmitted. During reception of the survey signal by the first and second receivers 6 and 8, the measure actuate switch 81 is operated thereby effecting measurement of the magnitude and phase of the survey difference signal at the output 68 and storage of same in the magnitude and phase registers 70 and 79 respectively. The computer 84 is again actuated and the values of the magnitude and phase of the survey difference signal are transferred into the memory 85.

In order to obtain the magnitude and phase of the signal components that have been reflected from subterranean formations, the magnitude and phase of the calibration difference signal are vectorially subtracted from the magnitude and phase of the survey difference signal. The resultant magnitude and phase for a given position along the survey path 117 is the relative magnitude and phase of the reflected signal components and is stored in the memory 85, and the magnitudes and phases of the calibration and survey difference signals are cleared therefrom.

In the foregoing description of data taking, it has been assumed that the transmitter and receiver loop antennas 5 and 9 respectively have been in an orientation as illustrated in FIG. 6, wherein the electric field vectors 119 and 120 respectively thereof are aligned. The electric field vectors 119 and 120 are parallel to the planes of the respective loop antennas. In the antenna orientation shown in FIG. 6, the current in the receiver loop 9 is developed mainly from the electric field vector 120 of the incoming survey signal. Therefore, the resultant, relative magnitude and phase of the reflected signal components is a measure of the electrostatic nature of the subterranean formations from which the signal has been reflected. It is also desirable to obtain a measure of the electromagnetic nature of the subterranean formations; therefore, it is desirable to obtain data wherein the current in the loop 9 is mainly a function of the magnetic field vector of the signal. For this purpose the transmitter and receiver loop antennas 5 and 9 are rotated 90° about a vertical axis whereby the magnetic field vectors 121 and 122 respectively of the transmitter and receiver loops 5 and 9 are aligned, as illustrated in FIG. 7. The magnetic field vectors 121 and 122 are perpendicular to the planes of the respective loop antennas.

The procedure for obtaining data in the magnetic orientation shown in FIG. 7 is substantially the same as that for the electric orientations shown in FIG. 6 with minor exceptions. During reception of the calibration signal in the magnetic orientation, it is necessary to increase the gains of the RF amplifier 30 and/or IF amplifier 36 of the second receiver 8 because of the diminished response of the loop antennas 5 and 9 in the magnetic orientation. Otherwise, the procedure is the same; a calibration signal is transmitted; the magnitude and phase of the calibration difference signal are measured and stored; the survey signal is transmitted; the magnitude and phase of the survey difference signal are measured and stored; the magnitude and phase of the calibration difference signals are vectorially subtracted from the magnitude and phase of the survey difference signal; and the resultant, relative magnitude and phase are stored in the memory 85.

After completing the data taking in the magnetic orientation, the loop antennas 5 and 9 are stored respectively in the transmitter vehicle 18 and the receiver vehicle 17. The transmitter and receiver vehicles 18 and 17 are then moved to the next position along the survey path 117, and data is taken in the electric orientation and then in the magnetic orientation.

At each position after the first position along the survey path 117, the calibration unit 20 is connected to the third receiver 15 to insure that the third receiver 15 has not drifted and that the gain settings are still the same. The third receiver 15 is then reconnected to the whip antenna 7 and the calibration signal is transmitted from the transmitter 2. If the response of the third receiver 15 is different from the preset values, the transmitter power outlet level is adjusted until the preset third receiver response levels are again achieved. Thus, the third receiver 15 is employed as a field strength meter for maintaining constant field strength at the composite receiver 16. After the transmitter power level has been adjusted, the first and second receivers 6 and 8 are adjusted to the preset response levels, and then are balanced until the differential output meter 23 reads zero.

When all of the positions along the survey path 117 have been surveyed, the computer 84 may be actuated to recall the resultant magnitudes and phases for each position and to control the plotter 86 to graph the data as a function of position. The memory 85 may be any suitable type of memory, such as magnetic core, magnetic tape, or the like; and the plotter 86 may be an X-Y plotter, a chart recorder, or the like. Therefore, in a survey wherein a number of parallel traverses are made across an area, it is possible to store all of the data until the survey has been completed at which time the data may be plotted.

Figure 9:
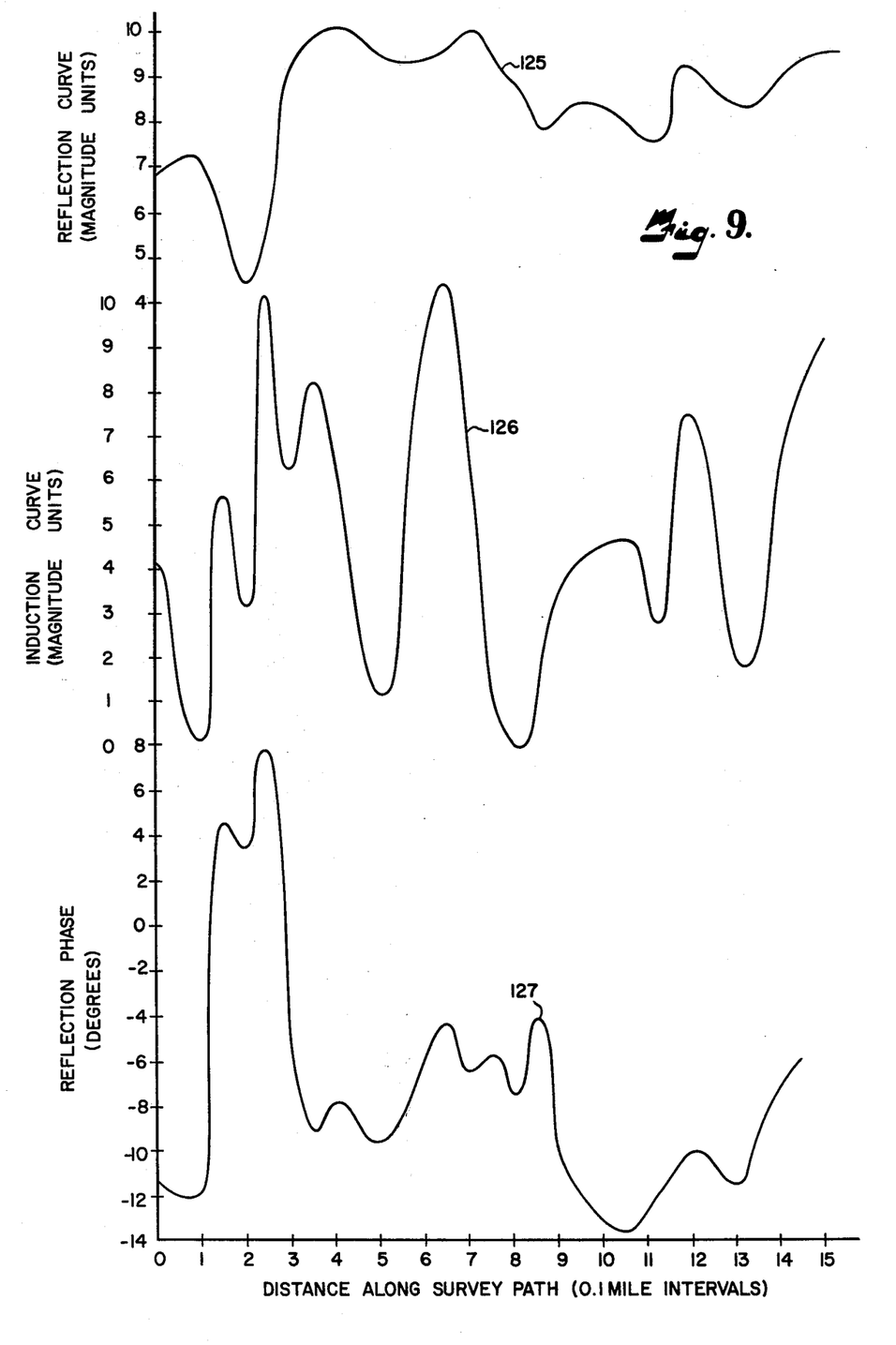
FIG. 9 is a composite graph illustrating a reflection curve, an induction curve, and a reflection phase curve for data taken by said apparatus at selected positions along a survey path.

FIG. 9 illustrates representative curves obtained by actual survey in the field. The top curve 125 is a reflection curve which is a graph of the relative magnitudes obtained with the transmitter and receiver loops 5 and 9 in the electric orientation of FIG. 6. The induction curve 126 is a graph of the magnitudes obtained with the loops 5 and 9 in the magnetic orientation of FIG. 7. The lower curve is a graph of the relative phase changes as a function of position, with the loops 5 and 9 in the electric orientation of FIG. 6. By comparison of the curves 125, 126, and 127 with similar curves obtained from surveying known deposits, the significance of the curves in FIG. 9 may be evaluated. Further, by comparison of a significant number of such graphs, graphic characteristics of certain kinds of subterranean formations may be identified, whereby the formations may be recognized from the graphic data alone. Such recognizable graphic characteristics may be referred to as a signature if the characteristics are distinct enough.

The method described in the present invention and the apparatus 1 may be used to locate various subterranean formations 130 including, but not limited to, hydrocarbon deposits, such as petroleum and natural gas, metallic and non-metallic mineral deposits, and geologic formations such as ground faults and cavities. Further, the apparatus 1 may be used to determine the depth of such formations.

In FIG. 8, the receiver vehicle 17 is positioned at R, a distance 2S from the position X of the transmitter vehicle 18 which is the normal separation distance of 0.4 to 0.7 miles; and normal data readings are taken. Of particular interest for depth determination is the relative phase. The receiver vehicle 17 is then moved a known distance to the position R', a distance 2S' from the transmitter position X, and a second set of data readings is taken. For a given locale, the propagation velocity of a radio wave in the ground, that is the linear velocity of the wave, is substantially constant. The relative phase of the reflected components is a measure of the delay time of the reflected components in traversing the subterranean path, in comparison to the surface propagated wave. Thus, the propagation velocity may be stated as the length of the path traversed, 2L, or 2L', divided by the delay time, which may be given in time or angular units. An equation may be set up in which the propagation velocities of the paths are equated. The respective depths D and D', which may be assumed to be equal if the separation distances 2S and 2S', are not greatly different, may be expressed in terms respectively of L and S and of L' and S' by the Pythagorean theorem. By proper algebraic manipulation and substitution, a set of two equations in terms of two unknowns may be developed and solved simultaneously to find the depth of the deposit 130.

While certain forms of the present invention have been described and illustrated, it is not to be limited thereto except insofar as such limitations are included in the following claims.

What is claimed and desired to secure by Letters Patent is:

1. In a method for radio geophysical surveying wherein a calibration signal of a predetermined frequency and containing substantially only vertically polarized signal components is transmitted from a transmitter, surface propagated, received on a first receiver adapted to receive vertically polarized signal components only and received on a second receiver adapted for receiving vertically and horizontally polarized signal components, and wherein a survey signal of said predetermined frequency and containing both vertically and horizontally polarized signal components is transmitted and is received by said receivers, said vertically polarized signal components being surface propagated and received by said first and second receivers and said horizontally polarized signal components being propagated into the earth and reflected to the surface by subterranean formations and received on said second receiver only, the improvement comprising the steps of:

(a) obtaining signals proportional to said calibration signal from said first and second receivers;

(b) applying said signals proportional to said calibration signal to a difference amplifier resulting in a calibration difference signal;

(c) measuring and recording the magnitude of said calibration difference signal and the phase thereof relative to the signal from said first receiver;

(d) obtaining signals proportional to said survey signal from said first and second receivers;

(e) applying said signals proportional to said survey signal to said difference amplifier resulting in a survey difference signal;

(f) measuring and recording the magnitude of said survey difference signal and the phase thereof relative to the signal proportional to said survey signal from said first receiver;

(g) vectorially subtracting the magnitude and phase of said calibration difference signal from the magnitude and phase of said survey difference signal resulting in a relative magnitude and phase of said reflected signal components;

(h) recording said relative magnitude and phase;

(i) similarly obtaining a relative magnitude and phase at each of a plurality of positions along a survey path; and (j) plotting said relative magnitude and phase for each of said positions thereby obtaining a graph from which characteristics of said subterranean formations are ascertained.

2. A method as set forth in claim 1 wherein:

(a) said transmitter includes a transmitting antenna adapted for radiating both vertically and horizontally polarized signal components and for emitting a radiation pattern including a horizontally directed electric field vector and a horizontally directed magnetic field vector;

(b) said second receiver includes a receiving antenna having a response pattern similar to said radiation pattern; and including the steps of:

(c) obtaining said relative magnitude and phase at each of said positions along said survey path with the respective electric field vectors of said antennas in a mutually aligned relation; and (d) obtaining said relative magnitude and phase at each of said positions with the respective magnetic field vectors of said antennas in a mutually aligned relation.

3. A method as set forth in claim 2 wherein each of said transmitting and receiving antennas is a loop antenna formed substantially in a loop plane, said loop antennas each having an electric field vector parallel to said loop plane and a magnetic field vector perpendicular to said loop plane, and wherein:

(a) said loop antennas are positioned with the loop plane vertical and substantially coplanar to thereby align said electric field vectors; and (b) said loop antennas are positioned with said loop planes vertical, parallel, and axially aligned to thereby align said magnetic field vectors.

4. A method as set forth in claim 1 wherein said receivers are spaced a first known distance from said transmitter for obtaining a first relative phase of reflected signal components and including the steps of:

(a) moving said receivers a second known distance from said transmitter;

(b) obtaining a second relative phase for reflected signal components received at said second known distance; and (c) computing the depth of said subterranean formations from a formula relating said known distances to said first and second relative phases.

5. A method as set forth in claim 1 wherein:

(a) each of said first and second receivers has an adjustable output level and an output level meter; and including:

(b) establishing common gain characteristics for said first and second receivers by adjusting said receivers to a predetermined output level for a given signal input level at a first of said positions along said survey path; and (c) balancing said first and second receivers to the same output level during reception of said calibration signal thereby, at each of said positions.

6. A method as set forth in claim 5 including:

(a) conducting a signal of known level and at said predetermined frequency into each of said first and second receivers at said first position along said survey path; and (b) adjusting each of said first and second receivers to said predetermined output level to thereby establish said common gain characteristics.

7. A method as set forth in claim 5 wherein the power output level of said transmitter is adjustable and including:

(a) providing a third receiver adapted for receiving vertically polarized signal components only and having an adjustable output level and an output meter;

(b) adjusting said third receiver to have said predetermined output level for said given signal input level at said first position along said survey path; and at each of said positions:

(c) adjusting said transmitter power output level such that the output level of said third receiver is substantially identical to said predetermined output level; and (d) adjusting the output levels of each of said first and second receivers to said predetermined output level subsequent to said adjusting said transmitter power output level.

8. A method as set forth in claim 7 including:

(a) conducting a signal of known level and at said predetermined frequency into each of said first, second, and third receivers at said first position; and (b) adjusting each of said first, second, and third receivers for said predetermined output level at said first position to thereby establish said common gain characteristics.

9. A method as set forth in claim 1 and including:

(a) recording said magnitude and phase of said calibration difference signal by electronically storing said magnitude in a magnitude register and said phase in a phase register;

(b) providing computer means operative to transfer said magnitude and phase of said calibration difference signal respectively from said magnitude and phase registers to memory means associated with said computer means;

(c) recording said magnitude and phase of said survey difference signal by storing same respectively in said magnitude and phase registers;

(d) said computer means transferring said magnitude and phase of said survey difference signal into said memory means;

(e) said computer means recalling said survey difference signal magnitude and phase and recalling and vectorially subtracting said calibration difference signal magnitude and phase respectively therefrom resulting in said relative magnitude and phase for one of said positions along said survey path;

(f) recording said relative magnitude and phase by said computer means storing same in said memory means;

(g) said computer means storing a relative magnitude and phase similarly obtained for each of said positions in said memory means; and (h) said computer means controlling a plotter to thereby plot a relative magnitude and phase for each of said positions thereby obtaining said graph.

10. In an apparatus for radio geophysical surveying including a transmitter, transmitting antenna means, a first receiver connected to a first receiving antenna responsive to vertically polarized signal components only, and a second receiver connected to a second receiving antenna responsive to both vertically and horizontally polarized signal components, each of said transmitter, transmitting antenna means, receivers, and receiving antennas being tuned to a predetermined frequency, said receivers having respective output signals in response to operation of said transmitter, said apparatus for determining the relative magnitude and phase of horizontally polarized signal components radiated from said transmitting antenna means, propagated into the earth, reflected to the surface by subterranean formations and received by said second receiver through said second receiving antenna, said relative magnitude and phase being determined for each of a plurality of positions along a survey path, the improvement comprising:

(a) a difference amplifier having one input connected to the output of said first receiver and another input connected to the output of said second receiver, said difference amplifier having a difference output signal proportional to the vectorial difference of said receiver output signals;

(b) means for measuring the magnitude of said difference signal connected to the output of said difference amplifier; and (c) phase measuring means connected to the output of said difference amplifier and to the output of said first receiver for measuring the phase of said difference signal relative to the phase of the output signal of said first receiver.

11. In an apparatus for radio geophysical surveying including a transmitter, transmitting antenna means, a first receiver connected to a first receiving antenna responsive to vertically polarized signal components only, and a second receiver connected to a second receiving antenna responsive to both vertically and horizontally polarized signal components, each of said transmitter, transmitting antenna means, receivers, and receiving antennas being tuned to a predetermined frequency, said receivers having respective output signals in response to operation of said transmitter, said apparatus for determining the relative magnitude and phase of horizontally polarized signal components radiated from said transmitting antenna means, propagated into the earth, reflected to the surface by subterranean formations and received by said second receiver through said second receiving antenna, said relative magnitude and phase being determined for each of a plurality of positions along a survey path, the improvement comprising:

(a) a difference amplifier having one input connected to the output of said first receiver and another input connected to the output of said second receiver, said difference amplifier having a difference output signal proportional to the vectorial difference of said receiver output signals;

(b) means for measuring the magnitude of said difference signal connected to the output of said difference amplifier;

(c) phase measuring means connected to the output of said difference amplifier and to the output of said first receiver for measuring the phase of said difference signal relative to the phase of the output signal of said first receiver;

(d) a magnitude storage register connected to said magnitude measuring means for storing the magnitude of said difference signal;

(e) a phase storage register connected to said phase measuring means for storing the phase of said difference signal;

(f) computer means having said magnitude register and said phase register connected thereto and including:

(1) memory means for receiving two successive values, each of said values including the magnitude and the phase for each of said positions along said survey path; and (2) means for complex subtraction of a first of said successive values of said magnitude and phase from the second of said successive values for each of said positions, thereby obtaining a resultant magnitude and phase for each of said positions in said memory means; and (g) plotting means connected to said computer means for plotting said resultant magnitude and phase for each of said positions along said survey path.

12. In an apparatus for radio geophysical surveying including a transmitter, transmitting antenna means, a first receiver connected to a first receiving antenna responsive to vertically polarized signal components only, and a second receiver connected to a second receiving antenna responsive to both vertically and horizontally polarized signal components, each of said transmitter, transmitting antenna means, receivers, and receiving antennas being tuned to a predetermined frequency, said receivers having respective output signals in response to operation of said transmitter, said apparatus for determining the relative magnitude and phase of horizontally polarized signal components radiated from said transmitting antenna means, propagated into the earth, reflected to the surface by subterranean formations and received by said second receiver through said second receiving antenna, said relative magnitude and phase being determined for each of a plurality of positions along a survey path, the improvement comprising:

(a) a difference amplifier having one input connected to the output of said first receiver and another input connected to the output of said second receiver, said difference amplifier having a difference output signal proportional to the vectorial difference of said receiver output signals;

(b) means for measuring the magnitude of said difference signal connected to the output of said difference amplifier;

(c) phase measuring means connected to the output of said difference amplifier and to the output of said first receiver for measuring the phase of said difference signal relative to the phase of the output signal of said first receiver;

(d) each of said first and second receivers having an adjustable output level and an output level meter;

(e) a third receiver connected to said first receiving antenna, said third receiver having an adjustable output level and an output level meter;

(f) said third receiver being adjusted at the first of said positions along said survey path to a predetermined output level thereof for a given input level thereinto; and (g) said first and second receivers each being adjusted for said predetermined output level during reception of a signal containing said vertically polarized signal components only, at each of said positions.

13. An apparatus as set forth in claim 12 including: a calibration unit connected to each of said receivers at the first of said plurality of positions along said survey path, said calibration unit generating a signal of known level and frequency for establishing said predetermined output level.

14. An apparatus as set forth in claim 12 including:
(a) a single local oscillator for converting the frequency of the signals received by said receivers to a lower frequency, said local oscillator having a plurality of identical outputs;
(b) one of said identical outputs being connected to said first receivers;
(c) a second of said identical outputs being connected to said second receiver; and
(d) a third of said identical outputs being connected to said third receiver.

15. In an apparatus for radio geophysical surveying including a transmitter, transmitting antenna means, a first receiver connected to a first receiving antenna responsive to vertically polarized signal components only, and a second receiver connected to a second receiving antenna responsive to both vertically and horizontally polarized signal components, each of said transmitter, transmitting antenna means, receivers, and receiving antennas being tuned to a predetermined frequency, said receivers having respsective output signals in response to operation of said transmitter, said apparatus for determining the relative magnitude and phase of horizontally polarized signal components radiated from said transmitting antenna means, propagated into the earth, reflected to the surface by subterranean formations and received by said second receiver through said second receiving antenna, said relative magnitude and phase being determined for each of a plurality of positions along a survey path, the improvement comprising:

(a) a difference amplifier having one input connected to the output of said first receiver and another input connected to the output of said second receiver, said difference amplifier having a difference output signal proportional to the vectorial difference of said receiver output signals;

(b) means for measuring the magnitude of said difference signal connected to the output of said difference amplifier;

(c) phase measuring means connected to the output of said difference amplifier and to the output of said first receiver for measuring the phase of said difference signal relative to the phase of the output signal of said first receiver; and (d) said transmitter including:
(1) oscillator means providing an oscillator signal,
(2) a controlled transconductance amplifier connected to said oscillator means and having a gain control input, the gain of said controlled transconductance amplifier being determined by the level of an error signal applied at said gain control input,
(3) an RF amplifier connected to an output of said controlled transconductance amplifier,
(4) level sensing means connected to an output of said RF amplifier, said level sensing means generating an error signal proportional to the output level of said RF amplifier, and
(5) said error signal being communicated to said controlled transconductance amplifier gain control input to control the gain thereof, said level sensing means and said controlled transconductance amplifier being operative to maintain a preset power output level of said transmitter.

16. An apparatus as set forth in claim 15 including: a reference potentiometer connected to said level sensing means, said potentiometer being selectively adjustable to preset said power output level of said transmitter.

17. An apparatus as set forth in claim 15 including:
(a) a plurality of reference potentiometers, each potentiometer being selectively adjustable to preset a power output level of said transmitter; and
(b) switch means connected to said level sensing means and having each of said reference potentiometers connected thereto, said switch means being selectively operable to connect one of said reference potentiometers to said level sensing means to thereby preset a power output level of said transmitter.

18. An apparatus as set forth in claim 17 wherein said transmitter includes an RF power amplifier connected to said RF amplifier and has a plurality of transmitting antennas associated therewith and wherein:
(a) said switch means includes antenna switch means connected to said RF power amplifier and to each of said plurality of transmitting antennas; and
(b) operation of said switch means effects connection of one of said transmitting antennas to said RF power amplifier in addition to selection of a reference potentiometer associated with said one transmitting antenna.

19. An apparatus as set forth in claim 18 including: antenna changeover sequencer means connected to said switch means and to said controlled transconductance amplifier; said sequencer means being operative to decrease the power output level of said transmitter to a low level during operation of said switch means for protection of said antenna switch means.

* * * * *